United States Patent Office 3,127,977
Patented Apr. 7, 1964

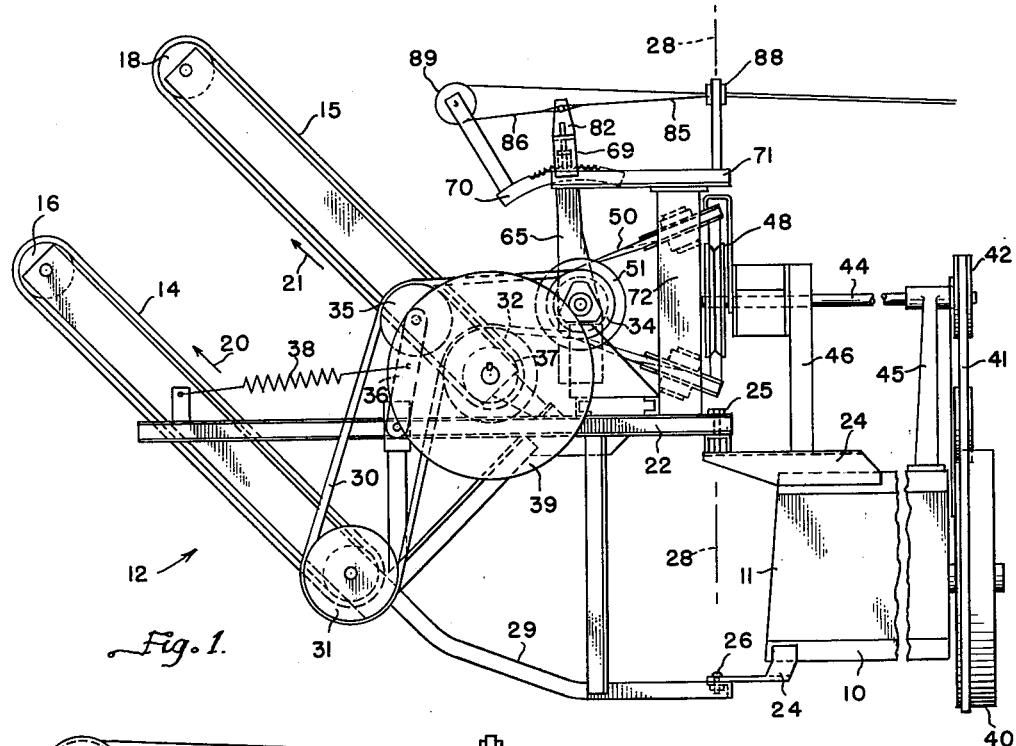
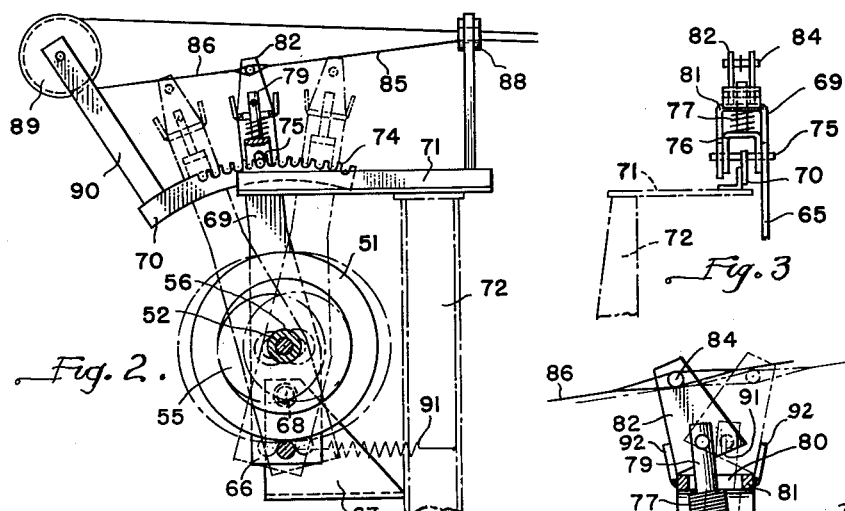
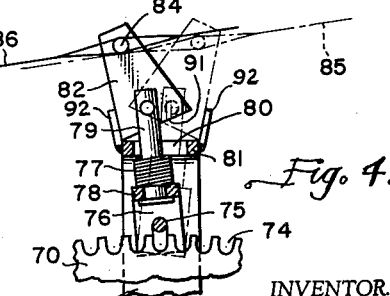
INVENTOR.
JAMES H. HOLLYDAY

3,127,977
CONVEYOR
James H. Hollyday, New Holland, Pa., assignor to Sperry Rand Corporation, New Holland, Pa., a corporation of Delaware
Filed Nov. 28, 1962, Ser. No. 240,564
7 Claims. (Cl. 198—128)

This invention relates to bale handling apparatus and more particularly to a variable speed bale thrower adapted to be driven from a power source on the baler which carries the thrower. More particularly, the invention relates to improved means for selectively controlling the speed at which the thrower is operated and thus the distances bales are trajected.

One object of this invention is to provide, in a variable speed bale thrower of the power-take-off type, positive control means whereby the speed of the thrower may be selectively established and locked in selected position.

Another object of this invention is to provide two-direction speed control for a bale thrower of the character described whereby the thrower may be either speeded up or slowed down as desired and then held in a set operative position.

Another object of this invention is to provide speed control mechanism in a bale thrower of the character described which includes locking and unlocking means operable by a baler operator from his position on the tractor towing the baler.

Another object of this invention is to provide a speed control mechanism having associated therewith a flywheel mounted in a novel relation to the trajecting means of the thrower to obtain optimum results.

A further object of this invention is to provide bale thrower control means having components so constructed and related to each other that wear problems are minimized.

A still further object of this invention is to provide a bale thrower control structure which is simply designed whereby it is inexpensive to manufacture and repair.

Other objects of the invention will be apparent hereinafter from the specification and from the recital in the appended claims.

In the drawing:

FIG. 1 is a fragmentary side elevation of the bale case portion of a baler having mounted thereon a bale thrower powered from the baler and provided with a speed control mechanism constructed according to this invention;

FIG. 2 is an enlarged vertical section of the speed control mechanism showing in solid lines one operative portion of the mechanism and showing in dotted lines different operative positions;

FIG. 3 is a view looking from right to left of FIG. 2 and showing the locking means of the control mechanism;

FIG. 4 is an enlarged part side elevation and part section showing the operation of the two directional control and illustrating the structure unlocked; and FIG. 5 is a view looking from right to left in FIG. 2 and showing the sheave arrangement employed in the thrower.

Referring now to the drawing by numerals of reference, and particularly to FIG. 1, 10 denotes the bale case of a hay baler having a rearward discharge end 11 from which successive bales emerge. Mounted on bale case 10 is a bale thrower 12 which forms an extension of the bale case. The thrower has a pair of upwardly and rearwardly inclined cooperating bale trajecting conveyors, namely, lower conveyor 14 and upper conveyor 15. Each conveyor comprises an endless belt or the like which travels around horizontally extending rollers, such as rollers 16 and 18. The upper reach of lower conveyor 14 and the lower reach of upper conveyor 15 travel rearwardly and they are engageable, respectively, with the bottom and top of each bale discharged from case 10.

Conveyors 14 and 15 are carried on a frame 22 connected to bale case 10 by brackets 24. This connection includes vertically aligned pivots 25 and 26 which establish a vertically extending axis 28 about which the thrower is laterally swingable. Such lateral swinging enables a change in the direction of trajectory of bales. As each bale is discharged, it is deposited on a support pan 29 which extends rearwardly and upwardly to guide the bales between conveyors 14 and 15.

For driving the thrower conveyors, an endless belt 30 is provided which extends around a sheave 31 for conveyor 14 and a sheave 32 for conveyor 15. Belt 30 receives power from a sheave 34 and the belt is maintained in tight driving engagement with the sheaves 31 and 32 by an idler 35 supported by member 36 pivoted on thrower frame 22. A spring 38 is interconnected between member 36 and frame 22 to bias the idler 35 toward tightened position. The sheave 32 of upper conveyor 15 has a flywheel 39, as shown in FIG. 1.

For driving sheave 34, power is derived from the baler 10. As shown in FIG. 1, the forward end of the bale case 10 has a flywheel 40 which may be driven from some suitable source of power such as a power-take-off connection to the tractor which tows the baler. An endless belt 41 extends around the flywheel and is driven thereby. Belt 41 extends around a pulley 42 supported at the forward end of a shaft 44. Shaft 44 is journaled on standards 45 and 46 and at the rearward end of the shaft a drive sheave 48 is mounted. Sheave 48 is mounted to rotate in a given position relative to the bale case 10. It operates through an endless belt 50 to transmit power to a driven sheave 51 supported on bale thrower 12. Driven sheave 51 and sheave 34 are mounted on a common shaft 52 (FIG. 5) which extends transversely relative to the bale case 10. Sheaves 51 and 34 are both split sheaves, sheave 51 having a movable half 54 and sheave 34 having a movable half 55. These halves face each other and they are fixedly interconnected by a sleeve 56 axially slidable on shaft 52. If the half 54 of sheave 51 moves toward its associated fixed half, then half 55 of sheave 34 is moved away from its associated fixed half, and vice versa. Thus, when sheave 51 opens, sheave 34 closes and correspondingly when sheave 51 closes sheave 34 opens. The operation of split sheaves 54 and 34 provide a variable speed transmission of power to the thrower conveyors 14 and 15 whereby the distance a bale is trajected may be varied.

To achieve the operation of sheaves 54 and 34, one end of shaft 52 is carried on arm 62 pivotally supported at 60 on bracket 61 connected to thrower frame 22. The opposite end of shaft 52 is supported upstanding on lever 65. Lever 65 has a lower end 66 supported on frame 22 by pivot 68 and bracket 67. Pivots 60 and 68 are coaxial and shaft 52 is eccentric thereto whereby when lever 65 and arm 62 are pivoted, shaft 52 is moved. As shown in FIG. 2, if the lever 65 is pivoted forwardly toward the bale case 10, shaft 52 correspondingly moves forwardly and in like respect when lever 65 is pivoted rearwardly, the shaft moves rearwardly.

For controlling the pivotal movement of the lever 65, a fore-and-aft extending rack 70 is provided adjacent the upper end 69 of lever 65. Rack 70 is mounted on a bracket 71 supported on standard 72 of frame 22 of the thrower. Rack 70 is arcuate and concentric with pivot 68 for lever 65. The rack is provided with a series of teeth 74 adapted to receive a dog in the form of a pin 75 carried on the upper end 69 of lever 65. Pin 75 extends transversely and it is mounted for movement in a radial direction relative to the lever. The pin is supported by a U-shaped member 76 slidable on lever 65. Member 76 has a top portion 78 which receives the head of a plunger 79 spring loaded downwardly by spring 77. Plunger 79 projects upwardly through a slot 80 of bracket 81 integral with lever 65. At its upper end, the plunger 79 is pivotally connected to a control member 82 the lower end 91 of which is rockably supported on top of bracket 81. As shown best in FIG. 4, a pair of spaced stops 92 are provided to limit sliding of the control member in the direction of extension of rack 70. The upper end of control member 82 carries a pin 84 to which a first cable 85 is connected for pivoting member 82 and unlatching dog 75 whereby lever 65 may be pulled in a forward direction. A second cable 86 is provided for pivoting member 82 to unlatch dog 75 and pull lever 65 in a rearward direction. The cable 85 extends through a guide 88 and then forwardly to a position adjacent the operator on the tractor towing the baler. Cable 86 extends around an idler pulley 89 carried on a bracket 90 extending upwardly from rack 70. After passing round idler 89, cable 86 extends forwardly through guide 88 to the operator's position. As shown in FIG. 1, guide 88 is located in vertical alignment with pivot axis 28 of the thrower. Thus, when the thrower is swung laterally to vary the direction of bale trajectory, the extension of the cables is not changed and therefore a pulling force is not exerted on lever 65.

In operation, when the cable 85 is pulled, the control member 82 pivots to the dotted position shown in FIG. 4. The lower end 91 of the control member rocks on the bracket 81 and plunger 79 is pulled upwardly. The spring 77 interposed between member 76 and bracket 81 is compressed and pin 75 is retracted radially from teeth 74 of the rack 70. Once pin 75 is free of the teeth 74, the lever 65 is free to pivot forwardly. When the operator releases cable 85, spring 75 becomes effective to force pin 75 downwardly and back into engagement with one of the teeth on the rack 70.

When the cable 86 is pulled, the control member 82 pivots in the opposite direction as shown in solid lines in FIG. 4, whereupon spring 77 is again compressed and plunger 79 is moved upwardly. Once the dog 75 is free of the teeth 74, lever 65 may be swung rearwardly as shown in FIG. 2.

With this structure, a positive control is exerted upon the lever 65 and thus on the position of the shaft 52. Shaft 52 can be pivoted forwardly or rearwardly as desired and locked in adjusted position. When shaft 52 is moved forwardly, split sheave 51 closes while split sheave 34 opens and when the shaft is moved rearwardly, sheave 51 opens while sheave 34 closes. The interaction of these split sheaves produces a variable speed in the drive to the thrower conveyors 14 and 15 through belt 30.

The action of the belt 50 on sheave 51 enables the pivoting of the lever 65 in a forward direction easier than pivoting the lever in a rearward direction. To assist the operator in the use of the cable 86, a spring 91 (FIG. 2) is provided and interconnected between the lower end 66 of lever 65 and the standards 72.

With the structure described, the operator merely has to pull on the first cable 85 to slow down the thrower and thereby throw bales a shorter distance or pull on the cable 86 to speed up the thrower and throw bales a greater distance. Which ever speed of operation is selected can be positively established by the particular tooth 74 on the rack 70 which is engaged by pin 75. Once established, lever 65 is locked in adjusted position whereby the transmission of power to the thrower is held constant. The slot 80 in bracket 81 allows fore-and-aft movement of the plunger 79 when control member 82 is pivoted thereby reducing wear of the plunger on the top 81 of the bracket. More important, however, is the fact that slot 80 allows rocker member 82 to pivot on the corners of bottom 91, rendering the structure operative with less force and effort by the operator. The overall structure is relatively simple and inexpensive whereby manufacture assembly and repair costs are maintained at a minimum.

Since the cables 85 and 86 extend forwardly they may be located closely adjacent to the operator on the tractor towing the baler. The operator may control the speed of the thrower without having to leave the tractor seat. The pivoting of the lever 65 is relatively free and easy in a forward direction and of the spring 91 assists the operator in pivoting the lever in the opposite direction.

The location of flywheel 39 is also important. The wheel is directly connected to sheave 32 and thus flywheel forces are direct to conveyor 15 and not through a belt. Since belt 30 travels counterclockwise, the flywheel effect on sheave 31 for conveyor 14 is on the power side of the belt reaches and thus direct. Further, the direct relation of flywheel 39 to belt 30 results in less loads on belt 50 than is the case if the flywheel was carried on shaft 52.

While this invention has been described in connection with a particular embodiment thereof, it will be understood that it is capable of modification, and this application is intended to cover any variations, uses, or adaptations following, in general, the principles of the invention and including such departures from the present disclosure as come within known customary practice in the art to which the invention pertains, and as fall within the scope of the invention or the limits of the appended claims.

Having thus described my invention, what I claim is:

1. A bale thrower mountable on the bale case of a baler as an extension thereof to receive discharged bales and traject them from the baler comprising, in combination, a frame, bale trajecting means carried on said frame, a lever extending upwardly relative to said frame and having a lower end and an upper end, split sheave means rotatably carried on said lever between said ends, means connecting said split sheave means to said bale trajecting means, means supporting said lever lower end on said frame for pivotal movement about an axis transverse to said bale case, a rack extending perpendicular to said transverse axis adjacent said lever upper end and having a series of teeth thereon, a dog selectively engageable with said teeth, means supporting said dog on said lever upper end for movement into and out of engagement with said rack teeth to lock the lever to the rack and in a selected pivotal position, spring means interposed between said lever and said dog biasing the dog toward said teeth, a control member connected to said dog and engaging said lever for rockable movement to each side of a neutral position, the engagement location of said control member and said lever changing when the control member is rocked, said dog engaging said teeth when said control member is in said neutral position and being withdrawn therefrom against said spring means when the control member is rocked to either side of the neutral position, and means for rocking said control member and pivoting said lever.

2. A bale thrower mountable on the bale case of a baler as an extension thereof to receive discharged bales and traject them from the baler comprising, in combination, a frame, bale trajecting means carried on said frame, means for pivotally mounting said frame on the baler bale case for lateral swinging movement about a vertical axis, a lever extending upwardly relative to said frame and having a lower end and an upper end, sheave means carried on said lever between said ends, means connecting said sheave means to said bale trajecting means, means supporting said lever lower end on said frame for pivotal movement about an axis transverse to said bale case, a rack extending perpendicular to said transverse axis adjacent said lever upper end and having a series of teeth thereon, a dog selectively engageable with said teeth, means supporting said dog on said lever upper end for movement into and out of engagement with said rack teeth to lock the lever to the rack and in a selected pivotal position, spring means interposed between said lever and said dog biasing the dog toward said teeth, a generally triangularly shaped control member pivotally connected to said dog and rockable on said lever to each side of a neutral position, said dog engaging said teeth when said control member is in said neutral position and being withdrawn therefrom against said spring means when the control member is rocked to either side of the neutral position, a first cable for rocking said control member and pivoting said lever in one direction, a second cable for rocking said control member and pivoting said lever in an opposite direction, a pulley around which said first cable extends and located at the end of said rack remote from said bale case, and a guide adjacent the opposite end of said rack and in vertical alignment with said pivot axis over which said first and second cables extend.

3. A bale thrower mountable on the bale case of a baler as an extension thereof to receive discharged bales and traject them from the baler comprising, in combination, a frame, a pair of cooperative bale trajecting conveyors carried on said frame and rotatable relative thereto, each of said conveyors having a sheave to receive power for driving its associated conveyor, a flywheel coaxially connected to the sheave for one of said pair of conveyors, a lever extending upwardly relative to said frame and having a lower end and an upper end, split sheave means carried on said lever between said ends, means connecting said split sheave means to said conveyor sheaves, means supporting said lever lower end on said frame for pivotal movement about an axis transverse to said bale case, a rack extending perpendicular to said transverse axis adjacent said lever upper end and having a series of teeth thereon, a dog selectively engageable with said teeth, means supporting said dog on said lever for movement into and out of engagement with said rack teeth to lock the lever to the rack and in a selected pivotal position, spring means interposed between said lever and said dog biasing the dog toward said teeth, a control member connected to said dog and engaging said lever for rockable movement to each side of a neutral position, the engagement location of said control member and said lever changing when the control member is rocked, said dog engaging said teeth when said control member is in said neutral position and being withdrawn therefrom against said spring means when the control member is rocked to either side of the neutral position, and means for rocking said control member and pivoting said lever.

4. A bale thrower mountable on the bale case of a baler as an extension thereof to receive discharged bales and traject them from the baler comprising, in combination, a frame, bale trajecting means carried on said frame, a lever extending upwardly relative to said frame and having a lower end and an upper end, split sheave means rotatably carried on said lever between said ends, means connecting said split sheave means to said bale trajecting means, means supporting said lever lower end on said frame for pivotal movement about an axis transverse to said bale case, a rack extending perpendicular to said transverse axis adjacent said lever upper end and having a series of teeth thereon, a dog selectively engageable with said teeth, means supporting said dog on said lever upper end for movement into and out of engagement with said rack teeth to lock the lever to the rack and in a selected pivotal position, spring means interposed between said lever and said dog biasing the dog toward said teeth, a control member connected to said dog and rockable on said lever to each side of a neutral position, said dog engaging said teeth when said control member is in said neutral position and being withdrawn therefrom against said spring means when the control member is rocked to either side of the neutral position, and means for rocking said control member and pivoting said lever comprising a pair of remote control cables, one to rock the control member in one direction and the other to rock the control member in an opposite direction.

5. A bale thrower mountable on the bale case of a baler as an extension thereof to receive discharged bales and traject them from the baler comprising, in combination, a frame, bale trajecting means carried on said frame, a lever extending upwardly relative to said frame and having a lower end and an upper end, split sheave means rotatably carried on said lever between said ends, means connecting said split sheave means to said bale trajecting means, means supporting said lever lower end on said frame for pivotal movement about an axis transverse to said bale case, a rack extending perpendicular to said transverse axis adjacent said lever upper end and having a series of teeth thereon, a dog selectively engagable with said teeth, a plunger supporting said dog on said lever upper end for movement into and out of engagement with said rack teeth to lock the lever to the rack and in a selected pivotal position, spring means interposed beween said lever and said plunger biasing the dog toward said teeth, a support on said lever having an opening through which said plunger extends, a control member to which said plunger is pivotally connected, said control member engaging said lever support for rockable movement thereon to each side of a neutral position, said dog engaging said teeth when said control member is in said neutral position and being withdrawn therefrom against said spring means when the control member is rocked to either side of the neutral position, and means for rocking said control member and pivoting said lever.

6. A bale thrower as recited in claim 5 wherein said support opening comprises a slot elongated in the direction of extension of said rack.

7. A bale thrower as recited in claim 5 wherein stops are provided on said lever support to prevent said control member from sliding on said lever and to permit pivotal movement of the control member on opposite ends thereof.

References Cited in the file of this patent
UNITED STATES PATENTS 1,796,127    Stephenson   ------------ Mar. 10, 1931
3,095,962    Hollyday   -------------- July 2, 1963